Aug. 2, 1955   B. G. FRANCIS   2,714,547
RECORDING APPARATUS
Filed April 18, 1951   2 Sheets-Sheet 1

ATTEST
Clarence R. Batty, Jr.

INVENTOR.
BILLY G. FRANCIS
BY
Norbert E. Birch

Aug. 2, 1955      B. G. FRANCIS      2,714,547
RECORDING APPARATUS

Filed April 18, 1951      2 Sheets—Sheet 2

ATTEST
Clarence R. Patty, Jr.

INVENTOR.
BILLY G. FRANCIS
BY
Norbert E. Burch

United States Patent Office 2,714,547
Patented Aug. 2, 1955

2,714,547

RECORDING APPARATUS

Billy G. Francis, De Ridder, La., assignor to The Atlantic Refining Company, Philadelphia, Pa., a corporation of Pennsylvania Application April 18, 1951, Serial No. 221,623

3 Claims. (Cl. 346—33)

This invention relates to an improvement in measuring and recording apparatus, and has particular applicability to such apparatus when used to record the flow of gas to oil wells from which crude oil is being produced by the so-called gas lift method.

After a period of production, which varies depending upon reservoir conditions, oil reservoirs reach a state such that the reservoir fluid will no longer be caused to flow to the surface by the force of reservoir pressure alone. When such a condition obtains, subsequent production of fluid from such reservoirs may be induced by installing gas lift equipment in each well. This gas lift equipment is adapted to permit the intermittent injection of gas under pressure into the tubing string to cause fluid which is in said tubing above the point of injection of the gas to rise to the surface.

The operation of gas lift equipment requires a supply of gas under pressure; and for economic reasons it is important that the amount of such gas which is furnished to each well be determined. One type of equipment which is presently used for this purpose comprises a gas flow meter of the type having a shaft rotatable with, or some other element movable in response to, changes in the rate of flow of gas through said meter. A stylus attached to the shaft or movable element is adapted to be moved across the face of a constantly moving chart in accordance with fluctuations in said rate of flow. The chart associated with the above described recording equipment is usually a disk chart which is adapted to make a complete revolution in 24 hours, after which it is removed and replaced by a new chart.

It is well known that it is characteristic of gas lift equipment to require the flow of gas only intermittently and for very short periods. For example, a typical well operated by gas lift might require an average of only one gas injection per hour, with each injection lasting for only a period of from approximately one-half to four minutes. It will be appreciated, therefore, that recording apparatus such as that described above may not be relied upon to furnish an accurate record of the amount of gas supplied to a well because of the fact that the total time during which gas is supplied is such a small proportion of the total time represented upon the constantly moving chart. For example, if a disk type record adapted to make one revolution in 24 hours be considered, it will be apparent that injection periods of four minutes or less will be represented upon said chart by very narrow band approximating a single line, since a four-minute period of time on a 24-hour disk chart is represented by only one degree of arc. If, on the other hand, the chart be driven more rapidly so that the injection period will cover a larger arc, the chart will make a complete revolution in a shorter period of time, requiring more frequent replacement of the chart and thus materially increasing operating costs because of the additional personnel which will be required to service the apparatus.

Accordingly, it is one object of this invention to provide recording apparatus which will produce a record from which the amount of gas supplied to a gas lift well over a predetermined period of time may be more accurately determined than is possible with presently known apparatus.

It is another object of this invention to provide recording apparatus capable of accurately recording the amount of gas supplied to a gas lift well and which requires a minimum of attention.

It is a further object of this invention to provide apparatus for measuring and recording the flow of gas to a gas lift well in which the recording chart is caused to move with respect to the recording stylus only during such times as there is a flow of gas to said gas lift well.

It is a further object of this invention to provide metering and recording apparatus of the type wherein a stylus is adapted to be moved across the face of a chart in accordance with variations in the value of the parameter being measured and in which the chart is adapted to be moved only during such times as the parameter being measured has a value other than zero.

Other objects and advantages of this invention will become apparent from the following description and accompanying drawings.

Briefly, this invention relates to a recording apparatus which has particular utility in recording the flow of gas to gas lift wells, although, as will be apparent to those skilled in the art, it may also be used for recording other types of information, such as temperature and pressure variations. As mentioned earlier in this specification, conventional recording apparatus which utilizes a constantly revolving chart is unsuitable for the accurate determination of gas flow in connection with gas lift wells because of the fact that gas injection into such wells is intermittent and for extremely short periods. This invention, therefore, is concerned with providing a recording apparatus in which the mechanism for driving the record chart is operable only during the periods when gas is flowing into the well with which the apparatus is associated, that is, when the rate of flow gas into said well is not zero. The apparatus is so designed that when the rate of flow is zero the chart is stationary, and when gas is flowing the chart moves at a relatively fast rate so that the segment of the chart covered by the stylus during each period of gas injection is sufficiently large to facilitate accurate interpretation. Since the chart utilized with apparatus according to this invention rotates only during a few minutes of each hour it is unnecessary to change the chart any more frequently than is required in the case of a constantly moving chart which is rotated at a much lower rate of speed. In short, this invention provides a recording apparatus which requires no more attention than conventional recording devices and yet which produces a chart which is capable of much more accurate interpretation.

Figure 1:
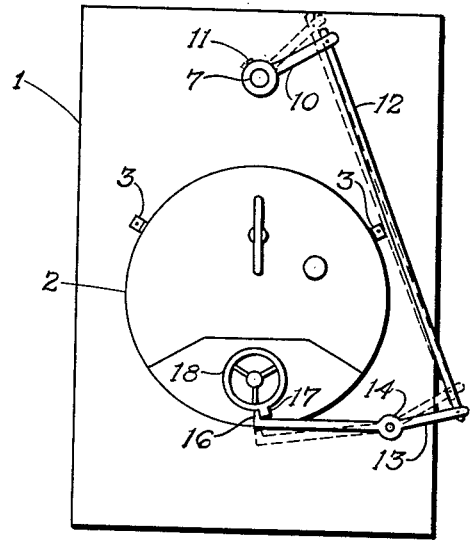
Figure 1 is a rear elevation of one form of recording apparatus constructed according to this invention.
Figure 2:
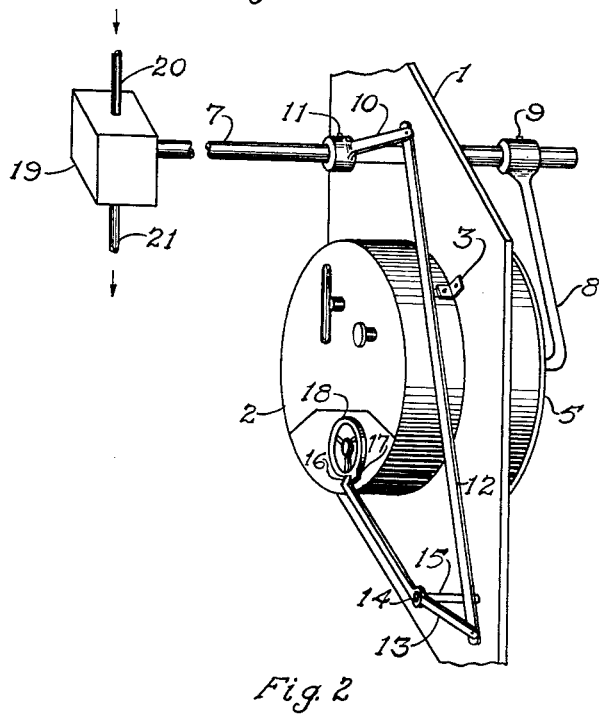
Figure 2 is a perspective view of the embodiment of the invention shown in Figure 1.
Figure 3:
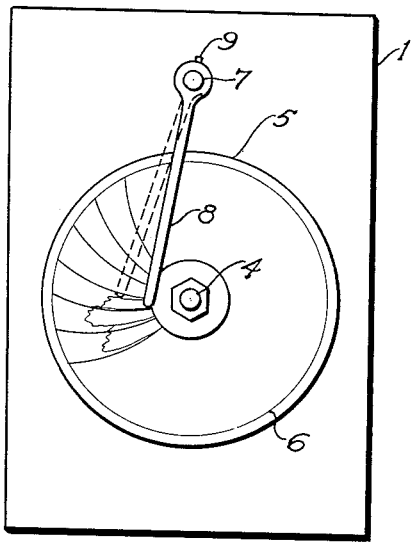
Figure 3 is a front elevation of the apparatus shown in Figures 1 and 2.

Referring now to the drawings, and particularly to Figures 1, 2, and 3, the numeral 1 designates a panel upon the rear side of which a chart driving means, or clock, 2 is mounted, as for instance by brackets 3. Shaft 4 of clock 2 passes through an aperture (not shown) provided therefor in panel 1 and has mounted thereon, forward of panel 1, disk 5 which is adapted to carry disk-type recording chart 6.

Panel 1 is provided with a second aperture (not shown)

through which shaft 7 passes. Stylus 8 which is adapted to be moved across the face of chart 6 is mounted on shaft 7 forwardly of panel 1. Relative rotational motion between shaft 7 and stylus 8 is prevented by means of set screw 9.

Rearwardly of panel 1 arm 10 is fixed to shaft 7, as for instance by set screw 11. The end of arm 10 has pivotally secured thereto one end of rod 12, the other end of which is pivotally secured to one end of yoke 13 which is pivotally mounted, as at 14, upon pin 15 which is secured to panel 1. The other end of yoke 13 is provided with a projection 16 which is adapted to engage a complementary projection 17 provided on balance wheel 18 of clock 2. When projections 16 and 17 are engaged, balance wheel 18 is prevented from oscillating and clock 2 is thereby rendered inoperative so that chart 6 remains stationary. It will be appreciated, of course, that projection 17 on balance wheel 18 must be located so that, upon the removal of projection 16, balance wheel 18 will again begin oscillating automatically. This can be easily accomplished by placing projection 17 in such a position that balance wheel 18 will always be stopped in a position in which its driving spring (not shown) is in a stressed condition as will be appreciated by those skilled in the art of clock mechanisms. Also, it is important that yoke 13 be accurately balanced about its pivot 14 so that it may be easily pivoted thereabout under the influence of a minimum force exerted by arm 10 through rod 12. With yoke 13 thus accurately balanced, it may be pivoted to start and stop clock 2 without imposing a load on shaft 7.

Numeral 19 designates schematically any metering instrument of the type having an element, such as shaft 7, adapted to be moved in accordance with variations in the parameter being measured. For present purposes 19 may be considered as a gas flow meter having a gas inlet 20 and outlet 21, and in which shaft 7 is caused to rotate counterclockwise, as viewed in Figure 1, about its longitudinal axis in response to an increase in the rate of flow of gas through meter 19, and in the opposite direction in response to a decrease. Gas flow meters of this type are well known in the art, and therefore a further discussion thereof is not thought to be necessary to an understanding of this invention.

In operation, so long as no gas is flowing through meter 19 stylus 8 will assume the position shown in solid lines in Figure 3, thus indicating a zero rate of flow. Likewise arm 10, rod 12, and yoke 13 will be maintained in their respective solid line positions as shown in Figure 1, whereby clock 2 is rendered inoperative, and chart 6 held stationary, as explained above. Upon the occurrence of the flow of gas through meter 19 shaft 7 will be caused to rotate counterclockwise as viewed in Figure 1. Such rotation of shaft 7 will cause stylus 8 to assume a position such, for example, as indicated by the dotted line shown in Figure 3; and arm 10, rod 12, and yoke 13, to assume their respective dotted line positions such, for example, as shown in Figure 1. It will be noted that when yoke 13 is in its dotted line position, projection 16 is removed from the path of projection 17, thus permitting balance wheel 18 of clock 2 to rotate freely and enabling clock 2 to drive chart 6.

Figure 4:
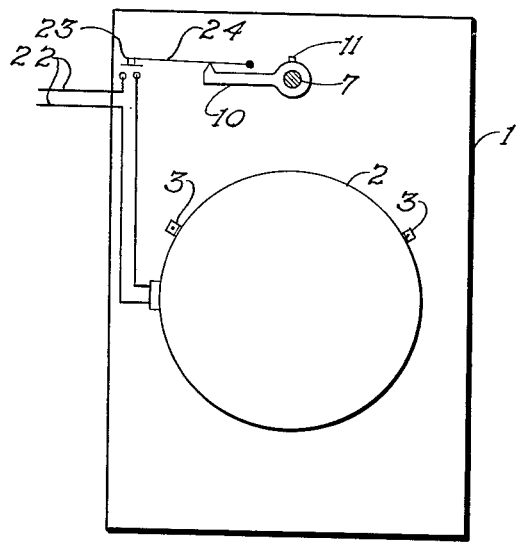
Figure 4 is a rear elevation of a second embodiment of this invention in which the recording chart is adapted to be driven by an electric driving means.

In Figure 4 there is shown a second embodiment of this invention in which the driving mechanism 2 for the recording chart comprises an electric motor or electric clock. Current for driving clock 2 is supplied through leads 22, in one of which is inserted switch 23 which is biased to the closed position, as for instance by leaf spring 24. It will be noted that rod 12 and yoke 13 which were employed in the first embodiment of the invention have been eliminated and that arm 10 directly operates switch 23 by contact with spring 24. It will be appreciated, of course, that spring 24 should preferably be made highly flexible so that it may be flexed to operate switch 23 without requiring any appreciable force to be exerted by arm 10, thus to avoid imposing a load on shaft 7.

In operation of this embodiment, so long as no gas is flowing, arm 10 will remain in the position shown in Figure 4, thus bearing against leaf spring 24 to keep switch 23 open, and maintaining clock 2 inoperative. However, upon the occurrence of gas flow, shaft 7, and consequently arm 10, will rotate counterclockwise as viewed in Figure 4, thus permitting switch 23 to close, thereby rendering clock 2 operative to rotate chart 6.

Thus, there is provided a recording apparatus, adaptable for use in recording the flow of gas to gas lift wells, wherein the recording chart is caused to move with respect to the stylus only during such times as gas is actually flowing. Since, as is pointed out above, the actual flowing time of the gas usually is for periods of less than about four minutes on an average of about once an hour, the chart will be driven for a total of less than two hours during a 24-hour period. Therefore, by way of example, the chart may be driven at the rate of one revolution in two hours, thus making it possible for each injection period to be represented by a much larger segment of the chart than would be possible if the chart were rotated at the rate of one revolution in 24 hours. The chart which is obtained is therefore much easier to read and capable of much more accurate interpretation; yet, because the chart is rotated only on the order of a few minutes each hour, it is unnecessary to service the apparatus by changing the chart more frequently than would be required by a conventional chart which is adapted to make one revolution in 24 hours.

While this novel recording apparatus has been explained and described in connection with recording the flow of gas to gas lift wells, it is obvious that apparatus of this same nature may be employed in many other situations wherein it is desired to measure and record an intermittently fluctuating parameter, such, for example, as temperature or pressure. Also, it is obvious to those skilled in the art that many minor changes may be made in the above described apparatus without departing from the spirit and scope of this invention. Accordingly, this invention is not considered as limited by the above description but only in accordance with the appended claims.

I claim:

1. In a gas flow metering and recording apparatus having a circular chart which rotates around a first axis, a shaft which rotates in response to the flow of gas around a second axis substantially parallel to said first axis, a stylus attached to said shaft and extending over the face of said circular chart, and a clock for rotating said chart, the novel combination which comprises control means connected to said clock for automatically starting or stopping said clock, an arm connected to said shaft, a lever operatively engageable and disengageable with said control means, said lever also being operatively connected to said arm whereby when said shaft is rotated in one direction due to a flow of gas the lever moves to a first position where said lever operates the control means so that the clock will automatically begin running and when said shaft is rotated to an extreme position in the opposite direction due to the termination of said flow of gas said lever is moved to a second position where said lever operates the control means so that the clock will be prevented from running.

2. In the gas flow metering and recording apparatus having a circular chart which rotates around a first axis, a shaft which rotates in response to the flow of gas around a second axis substantially parallel to said first axis, a stylus attached to said shaft and extending over the face of said circular chart, and a clock for rotating said chart, said clock having a balance wheel, the novel combination which comprises a projection on said balance wheel, an arm operatively connected to said shaft and rotatable therewith around said second axis, a lever operatively engageable and disengageable with the projection on said balance wheel, said lever also being operatively connected to said arm whereby when said shaft is rotated in one direction due to the flow of gas the lever disengages said balance wheel and starts the clock running and when said shaft is rotated to an extreme position in the opposite direction the lever engages the balance wheel so that the clock will stop, the projection on said balance wheel being so located that it will always engage said lever in such a position that upon disengagement the said balance wheel will immediately and always resume normal oscillation whereby to automatically restore said clock to operative condition.

3. In the gas flow metering and recording apparatus having circular chart which rotates around a first axis, a shaft which rotates in response to the flow of gas around a second axis substantially parallel to said first axis, a stylus attached to said shaft and extending over the face of said circular chart, and a clock for rotating said chart, the novel combination which comprises an electric motor for operating said clock, electric leads for the supply of current to said electric motor, a normally closing switch connected in one of said leads, an arm attached to said shaft, a lever operatively engageable with said switch so as to open and close said switch depending upon the position of said lever, said lever also being operatively connected to said arm whereby when said shaft is rotated in one direction due to the flow of gas, the lever closes said switch setting the motor and clock into operation and when said shaft is rotated to an extreme position in the opposite direction, said lever opens said switch thus stopping the operation of said motor and clock and the rotation of said circular chart.

References Cited in the file of this patent

UNITED STATES PATENTS

| | | |
|---|---|---|
| 1,154,438 | Rose | Sept. 21, 1915 |
| 1,696,600 | Hall | Dec. 25, 1928 |
| 2,325,312 | Follender | July 27, 1943 |
| 2,370,141 | Brunner | Feb. 27, 1945 |
| 2,496,552 | Lewis | Feb. 7, 1950 |
| 2,574,583 | Nallinger | Nov. 13, 1951 |